United States Patent
Miller (10) Patent No.: US 10,406,894 B2
(45) Date of Patent: Sep. 10, 2019

(54) WATER SHIELD MEMBER

(71) Applicant: Nissan North America, Inc., Franklin, TN (US)

(72) Inventor: Adam Miller, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 184 days.

(21) Appl. No.: 15/703,125

(22) Filed: Sep. 13, 2017

(65) Prior Publication Data

US 2019/0077232 A1 Mar. 14, 2019

(51) Int. Cl.
*B60J 5/04* (2006.01)
*B60R 22/24* (2006.01)
*B60R 22/34* (2006.01)

(52) U.S. Cl.
CPC ............ *B60J 5/0418* (2013.01); *B60J 5/0468* (2013.01); *B60R 22/24* (2013.01); *B60R 22/34* (2013.01); *B60R 2022/3402* (2013.01)

(58) Field of Classification Search
CPC ........ B60J 5/0418; B60R 22/24; B60R 22/34; B60R 22/08
USPC ........................................................ 280/803
See application file for complete search history.

(56) References Cited

U.S. PATENT DOCUMENTS

| | | | |
|---|---|---|---|
| 5,028,084 A | | 7/1991 | Fukumoto et al. |
| 5,054,814 A | * | 10/1991 | Hirasawa ................ B60R 22/08 |
| | | | 280/803 |
| 5,456,513 A | | 10/1995 | Schmidt |
| 6,226,927 B1 | | 5/2001 | Bertolini et al. |
| 7,753,435 B2 | | 7/2010 | Hanna |
| 8,045,744 B2 | | 10/2011 | Close |
| 9,216,630 B2 | | 12/2015 | Sheehy et al. |
| 2018/0345902 A1 | * | 12/2018 | Kajiwara ................ B60R 22/24 |

FOREIGN PATENT DOCUMENTS

| | | | | |
|---|---|---|---|---|
| CN | 106218556 A | | 12/2016 | |
| JP | 2001138864 A | * | 5/2001 | ............ B60J 5/0479 |

* cited by examiner

*Primary Examiner* — Faye M Fleming
(74) *Attorney, Agent, or Firm* — Global IP Counselors, LLP (57) ABSTRACT

A water shield member includes a cup-shaped concaved portion that has an opening, a hinge portion and a flange portion. The hinge portion extends from the concaved portion and extends around the opening of the concave portion, the hinge portion having a first thickness. The flange portion extends around the hinge portion and the concaved portion. The flange portion is spaced apart from the concaved portion and defines a first plane. The flange portion has a second thickness greater than the first thickness. The concaved portion, the hinge portion and the flange portion are all made of a common material.

20 Claims, 11 Drawing Sheets

WATER SHIELD MEMBER

BACKGROUND

Field of the Invention

The present invention generally relates to vehicle water shield member. More specifically, the present invention relates to water shield member that snuggly receives a seatbelt retraction device thereby protecting the seatbelt retraction device from rain, moisture and debris within a vehicle door.

Background Information

Some vehicles include a seatbelt retraction device that is installed within a door of the vehicle. The seatbelt retraction device can be exposed to rain, moisture and debris.

SUMMARY

One object of the present disclosure is to provide a water shield member that surrounds portions of a seatbelt retraction device, protecting it from rain and moisture.

Another object of the present disclosure is to provide a water shield member that elastically engages a portion of a seatbelt retraction device, reducing vibration and noise through direct contact with the portion of the seatbelt retraction device.

In view of the state of the known technology, one aspect of the present disclosure is to provide a vehicle door with a water shield member that includes a cup-shaped concaved portion having an opening, a hinge portion and a flange portion. The hinge portion extends from the concaved portion and extends around the opening of the concave portion, the hinge portion having a first thickness. The flange portion extends around the hinge portion and the concaved portion. The flange portion is spaced apart from the concaved portion and defines a first plane. The flange portion has a second thickness greater than the first thickness. The concaved portion, the hinge portion and the flange portion are all made of a common material.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
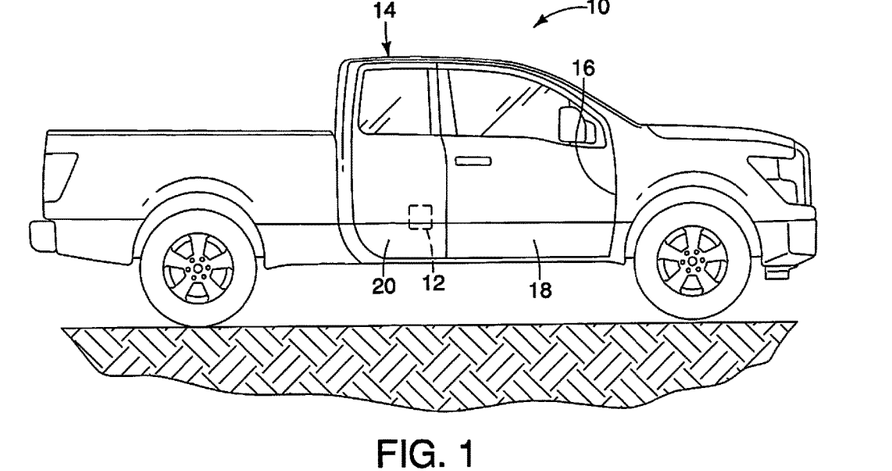
FIG. 1 is a side view of a vehicle with a door that includes a water shield member, with the door shown in a closed position in accordance with an embodiment.
Figure 2:
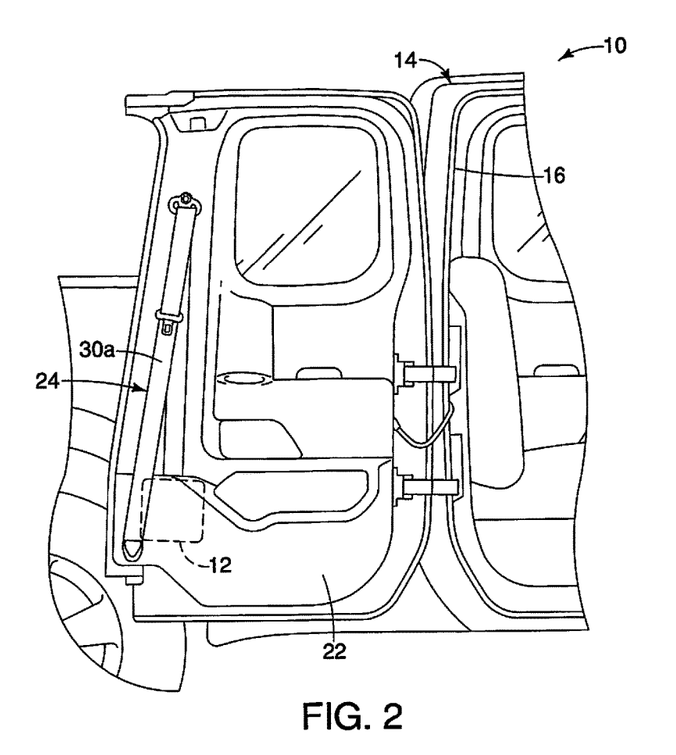
FIG. 2 is a side view of the vehicle showing the door, an interior trim panel attached to the door, a seatbelt assembly and the location of the water shield member in accordance with the embodiment.
Figure 3:
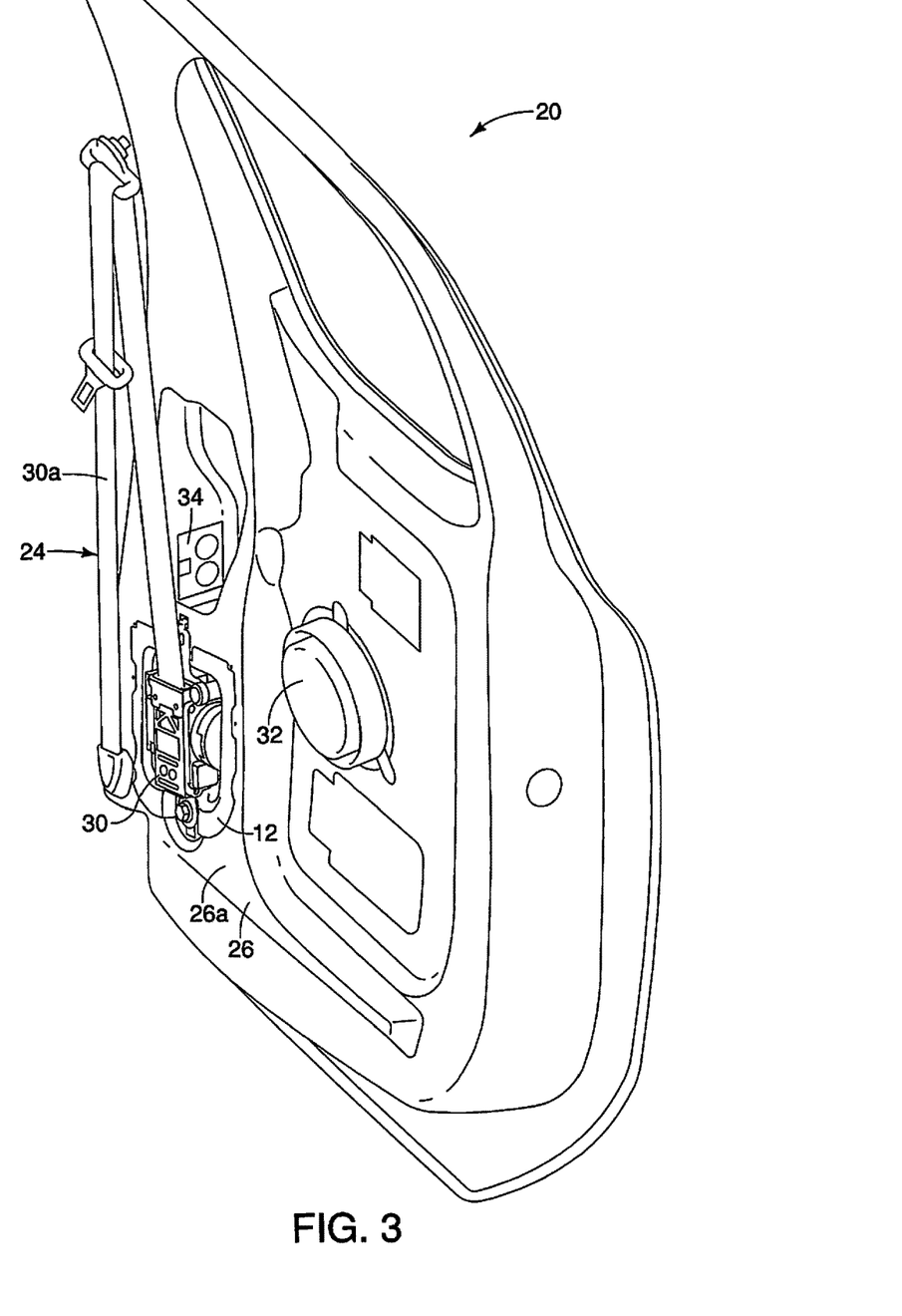
FIG. 3 is perspective view of the door removed from the vehicle and with the interior trim panel removed showing details of the water shield member installed to the door, a seatbelt retraction device installed to the door and extending into a concaved portion of the water shield member in accordance with the embodiment.
Figure 4:
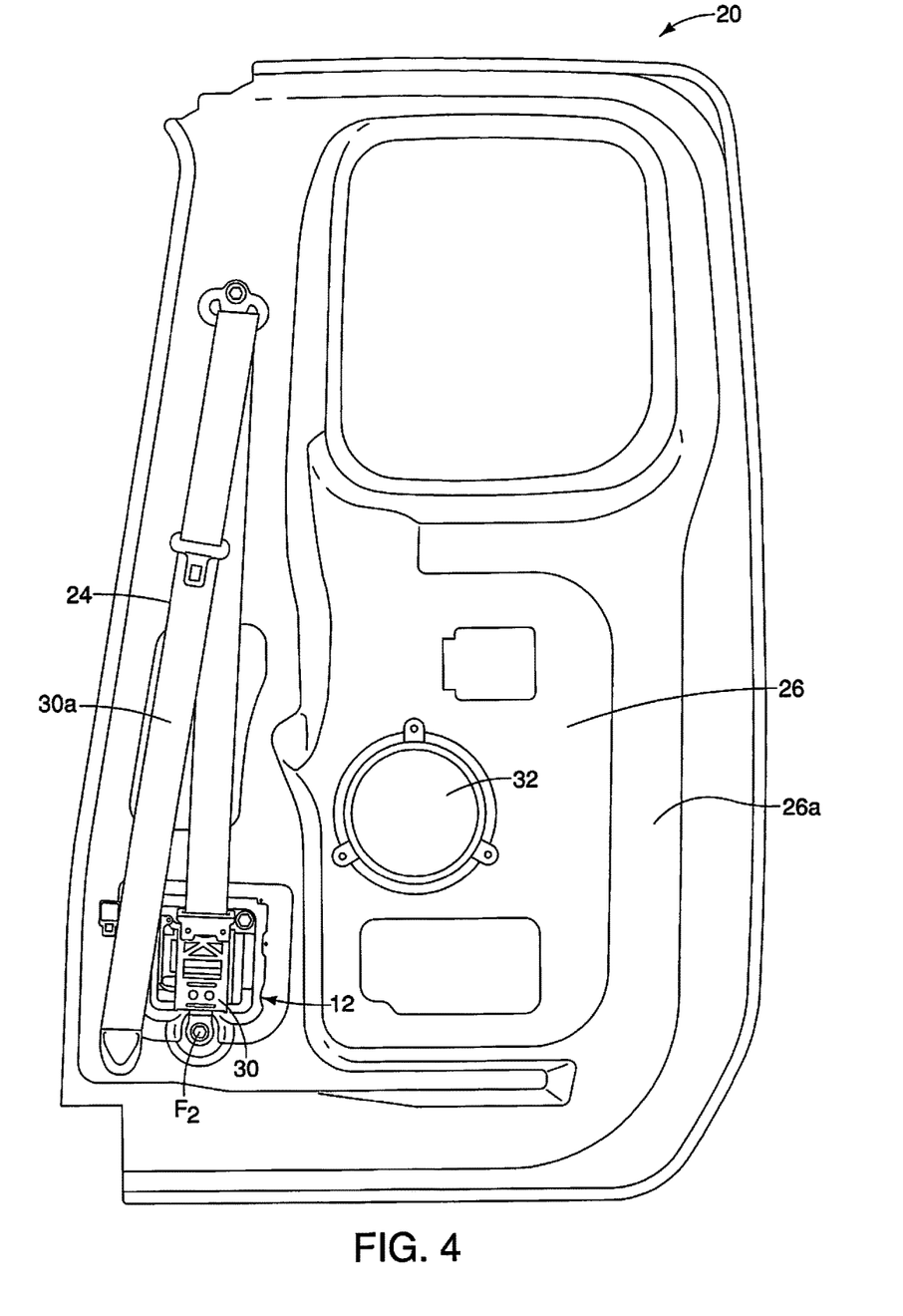
FIG. 4 is a side view of an interior surface of the door shown removed from the vehicle and with the interior trim panel removed showing details of the water shield member installed to the door and the seatbelt retraction device installed to the door and extending into the concaved portion of the water shield member in accordance with the embodiment.

Referring initially to FIGS. 1 and 2, a vehicle 10 having a water shield member 12 is illustrated in accordance with a first embodiment. A description of the water shield member 12 is provided below following a description of selected features of the vehicle 10.

As shown in FIG. 1, the vehicle 10 includes a vehicle body structure 14 that defines a door opening 16. The vehicle 10 further includes a front door 18 and a rear door 20 that cover the door opening 16 when in closed position (FIG. 1). As shown in FIG. 2 with the rear door 20 in an open position, an interior side of the rear door 20 includes a trim panel 22 (an interior trim panel) and a seatbelt assembly 24.

As shown in FIGS. 3-6 with the trim panel 22 removed, the rear door 20 includes an inboard or inner door panel 26 (inboard with the rear door 20 in the closed position). The inner door panel 26 includes an accessory opening 28 shown in FIGS. 7, 8 and 14-16. The water shield member 12 and a seatbelt retraction device 30 of the seatbelt assembly 24 are installed to the inner door panel 26 such that a portion of each of the water shield member 12 and a portion of the seatbelt retraction device 30 extend through the accessory opening 28. As described further below, the water shield member 12 protects the seatbelt retraction device 30 against intrusion of water and also dampens and/or eliminates rattling or other noises that might otherwise be produced by the seatbelt assembly 24 and the seatbelt retraction device 30. The seatbelt retraction device 30 includes a spring biased spool that receives a seatbelt 30a, retracting the seatbelt 30a about the spool when the seatbelt assembly 24 is not in use. Since seatbelt retraction devices are conventional devices, further description is omitted for the sake of brevity.

Figure 14:
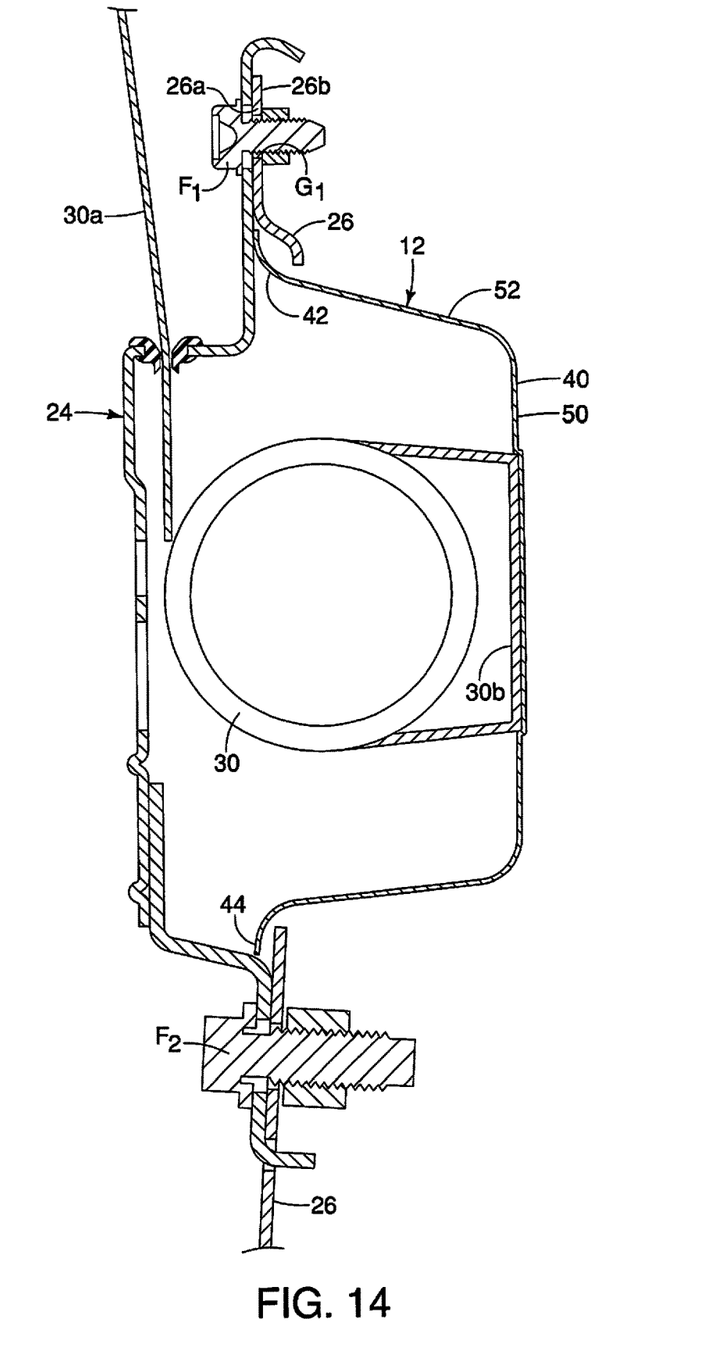
FIG. 14 is a cross-sectional view of the door, the water shield member and the seatbelt retraction device taken along the line 14-14 in FIG. 5, showing a level of deformation due to elasticity of the water shield member with the seatbelt retraction device pressing against the base section of the concaved portion in accordance with the embodiment.
Figure 15:
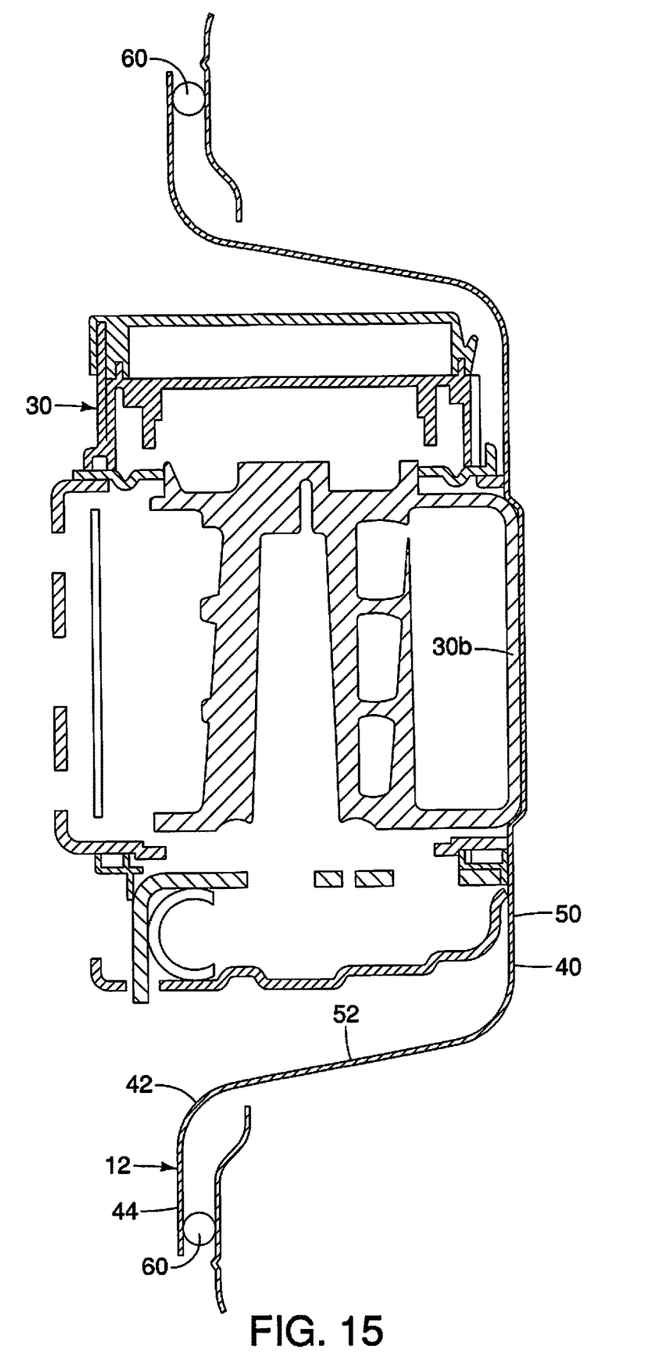
FIG. 15 is another cross-sectional view of the door, the water shield member and the seatbelt retraction device taken along the line 15-15 in FIG. 5, showing deformation due to elasticity of the water shield member with the seatbelt retraction device pressing against the base section of the concaved portion in accordance with the embodiment.
Figure 16:
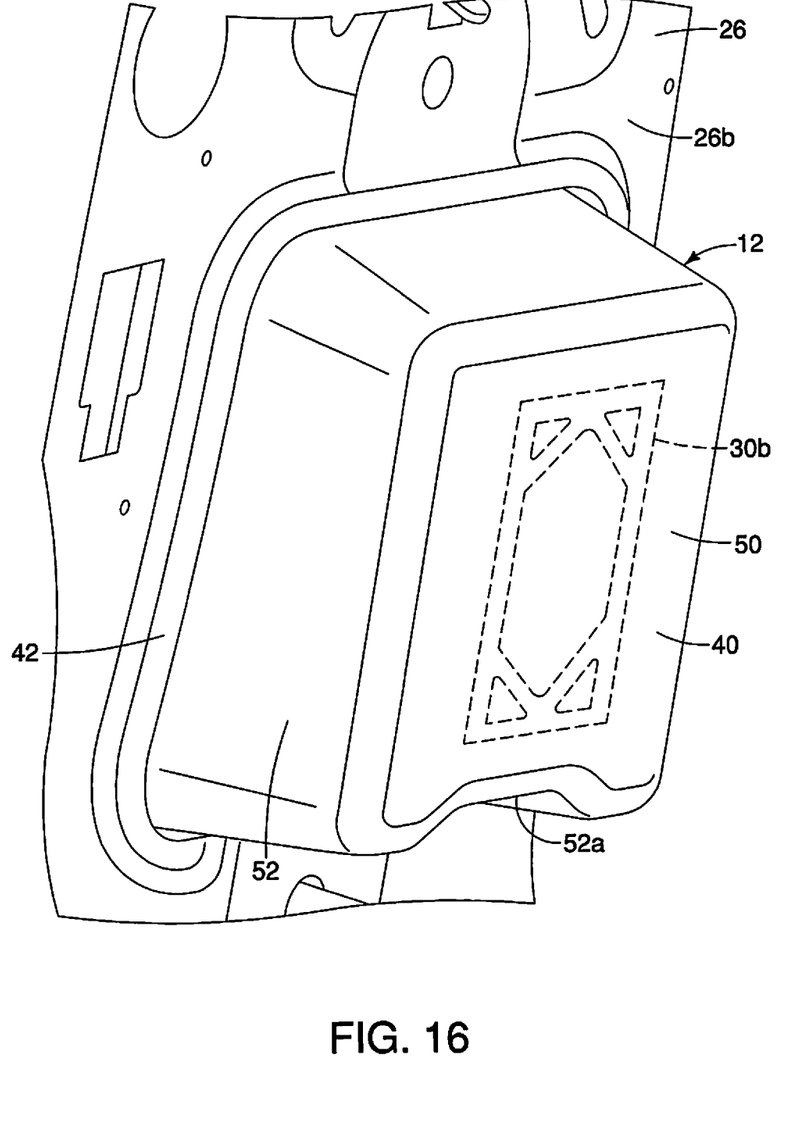
FIG. 16 is a perspective view of a second surface of the door, showing the concaved portion of the water shield member extending through the accessory opening of the door, with the seatbelt retraction device pressing against the base section of the concaved portion in accordance with the embodiment.

As shown in FIGS. 3-8 and 14-16, the inner door panel 26 has a first surface 26a and a second surface 26b (FIGS. 14-16 only). As shown in FIGS. 7, 8 and 14-16, the accessory opening 28 extends through the inner door panel 26 from the first surface 26a to the second surface 26b. The inner door panel 26 can also receive and support, for example, one of a plurality of audio speakers 32, a latch mechanism 34, a window regulator (not shown), and other conventional vehicle door features and accessories. Since audio speakers, latch mechanisms, window regulators are conventional features, further description is omitted for the sake of brevity.

Figure 8:
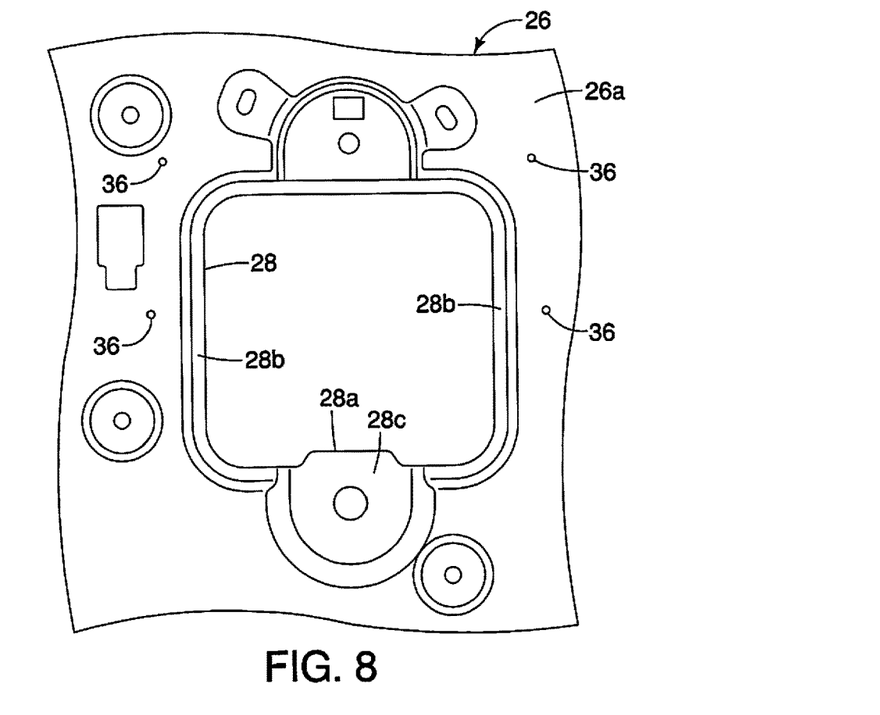
FIG. 8 is a side view of the interior surface of the door showing details of the surfaces around the accessory opening, including a plurality of alignment protrusions formed thereon, in accordance with the embodiment.
Figure 10:
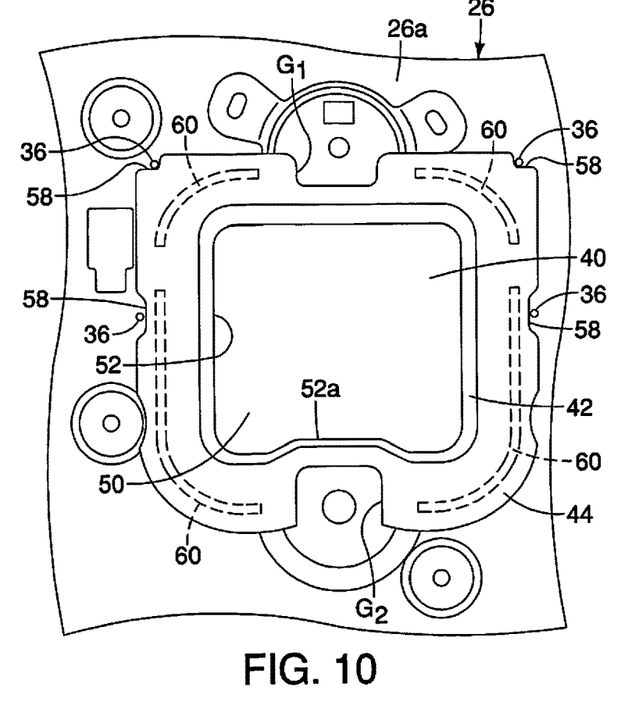
FIG. 10 is a side view showing the interior surface of the door and the water shield member installed therein with the recesses of the flange portion of the water shield member aligning with the alignment projections of the interior surface of the door in accordance with the embodiment.
Figure 11:
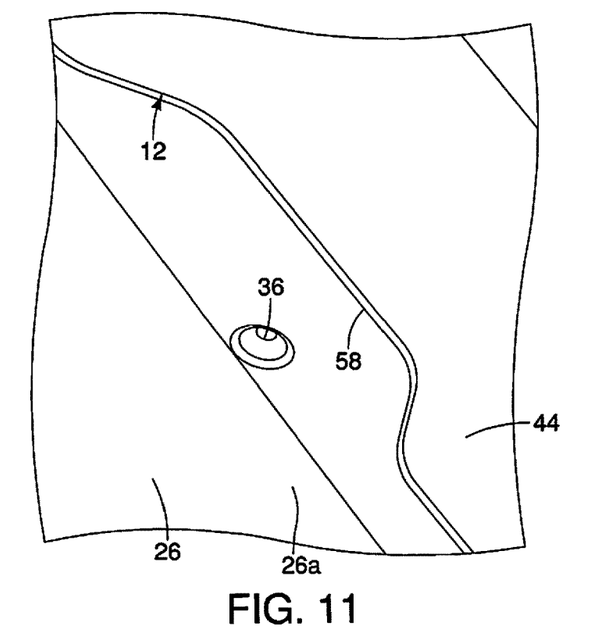
FIG. 11 is a perspective view showing one of the recesses of the flange portion and one of the alignment projections in accordance with the embodiment.

As shown in FIGS. 8 and 10, the first surface 16a of the inner door panel 26 includes a plurality of alignment protrusions 36. The plurality of alignment protrusions 36 are located adjacent to the accessory opening 28. The plurality of alignment protrusions 36 are used for aligning the water shield member 12 during installation and assembly. As shown in FIG. 8, the accessory opening 28 has an overall square shape with rounded corners and an upwardly extending projection 28a that defines a stop surface.

Figure 7:
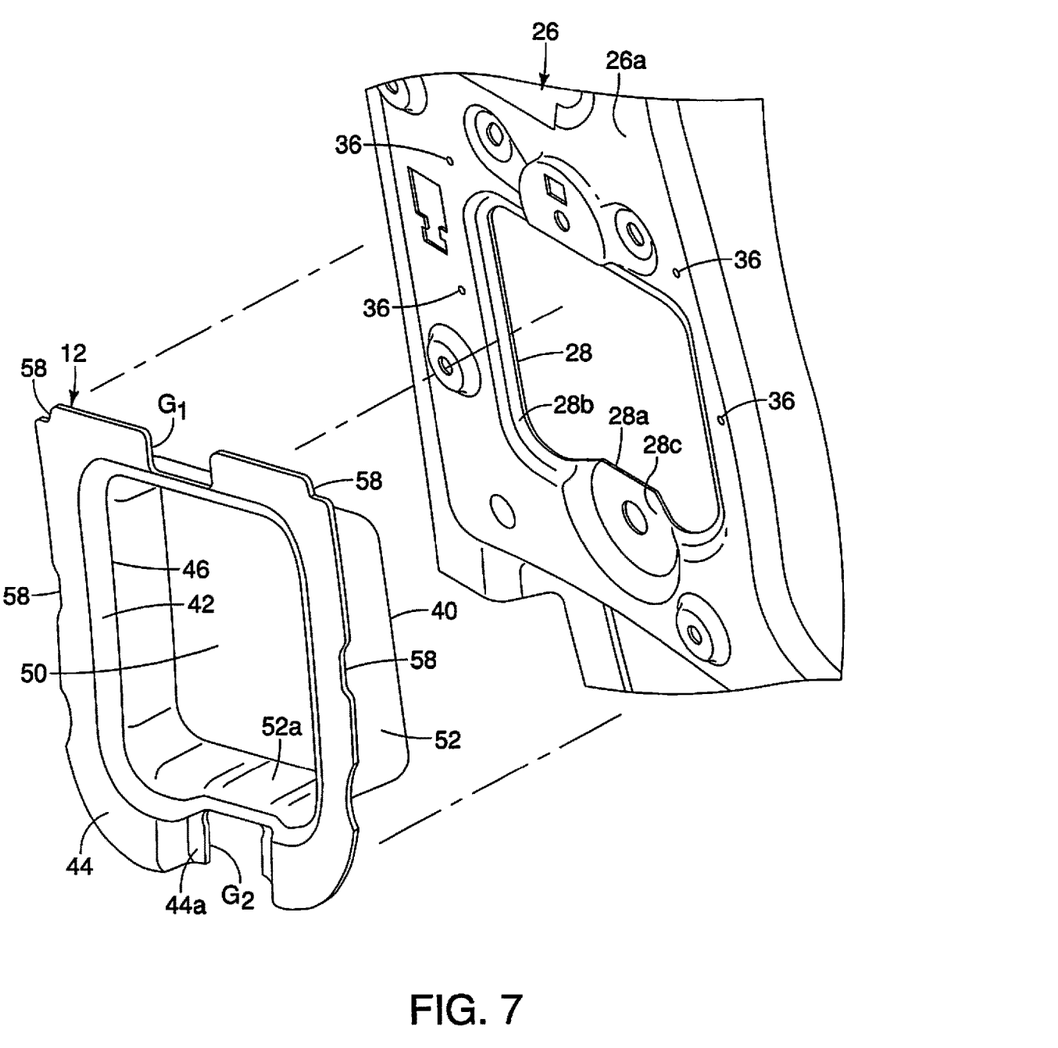
FIG. 7 is a perspective, exploded view showing details of the interior surface of the door including an accessory opening defined therein, and showing details of the water shield member with the concaved portion of the water shield member extending into the accessory opening in accordance with the embodiment.
Figure 9:
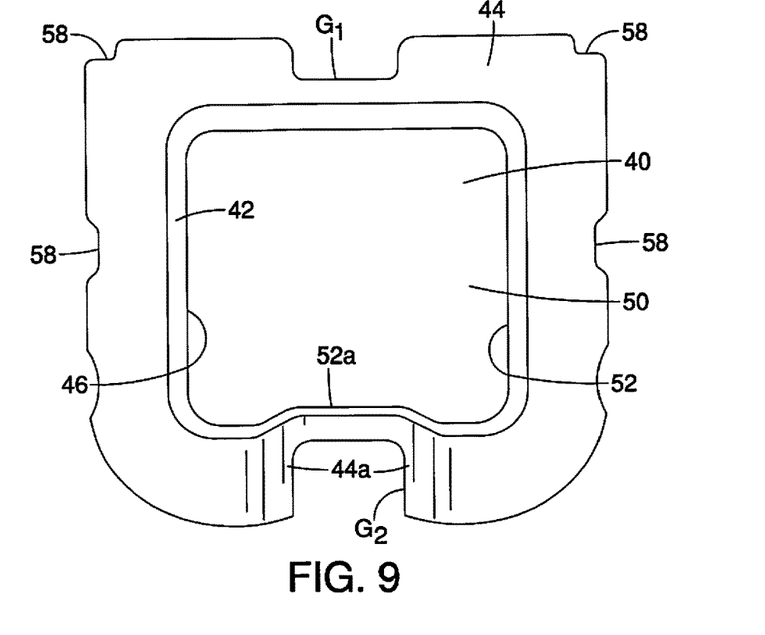
FIG. 9 is a side view of the water shield member shown removed from the door, the water shield member having the concaved portion, a hinge portion and a flange portion, the flange portion being formed with a plurality of alignment recesses in accordance with the embodiment.

As shown in FIGS. 7 and 9, the inner door panel 26 includes concaved portions 28b and 28c. The concaved portions 28b and 28c define surfaces that are parallel to the first surface 26a. The concaved portion 28b partially encircles the opening 28 extending on opposite sides of the opening 28, and further extending toward the projection 28a. The concaved portion 28c is located adjacent to and partially defines the projection 28a.

Figure 5:
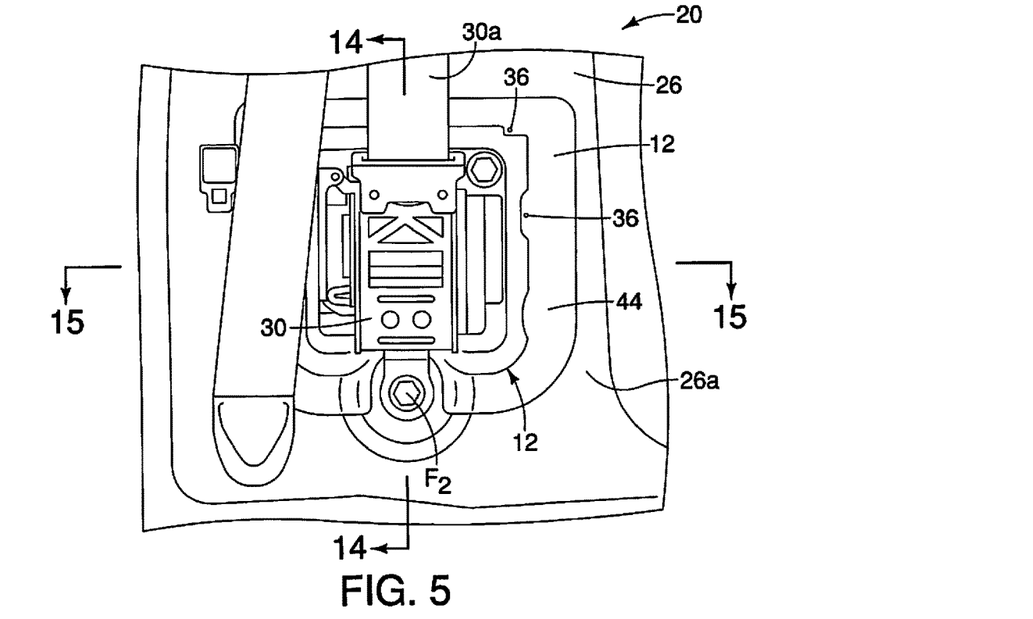
FIG. 5 is a side view of a portion of the interior surface of the door showing details of the water shield member and the seatbelt refraction device in accordance with the embodiment.
Figure 6:
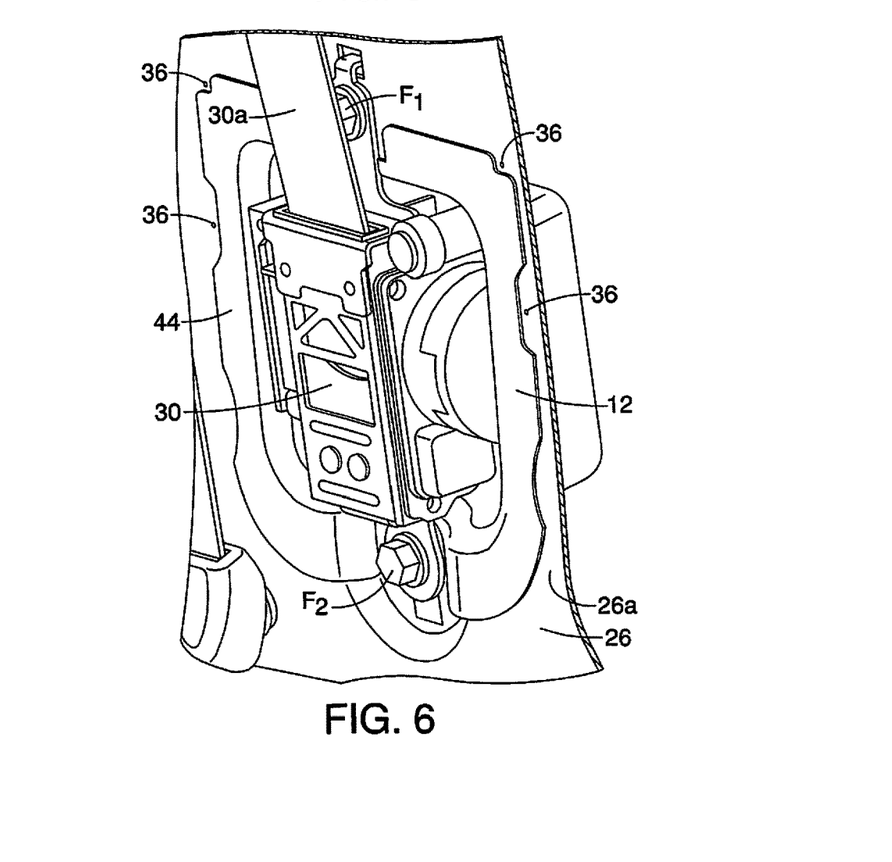
FIG. 6 is a perspective view of the portion of the interior surface of the door showing details of the water shield member and the seatbelt retraction device in accordance with the embodiment.

As shown in FIGS. 3-6, 14 and 15, the seatbelt retraction device 30 is fixedly attached to the first surface 26a with a portion of the seatbelt retraction device 30 extending into the accessory opening 28 via two fasteners, $F_1$ and $F_2$, as shown in FIGS. 5 and 6. The portion of the seatbelt retraction device 30 is also disposed within a portion of the water shield member 12, as is described in greater detail below.

A description of the water shield member 12 is now provided with specific reference to FIGS. 7 and 9-16. The water shield member 12 basically includes a cup-shaped concaved portion 40, a hinge portion 42 and a flange portion 44 that are all molded from the same material (a common material). For example, the cup-shaped concaved portion 40, the hinge portion 42 and the flange portion 44 can be formed of any suitable polymer, resin, rubber or plastic that is flexible, elastic, resilient and water proof. The water shield member 12 is preferably formed as a single, unitary, monolithic member such that the cup-shaped concaved portion 40 can hold water without leaking. Conversely, and preferably, the water shield member 12 is molded such that water cannot get into the cup-shaped concaved portion 40 when installed to the inner door panel 26, thereby preventing water from penetrating therethrough. As is described further below, the seatbelt retraction device 30 is inserted into the cup-shaped concaved portion 40 and is protected against intrusion of water and moisture by the water shield member 12. In other words, with the door 20 in the closed position, the water shield member 12 covers outboard facing portions of the seatbelt retraction device 30.

The cup-shaped concaved portion 40 (hereinafter referred to as the concave portion 40) has an opening 46 as shown at the left side of the water shield member 12, as viewed in FIGS. 7, 14 and 15.

Figure 13:
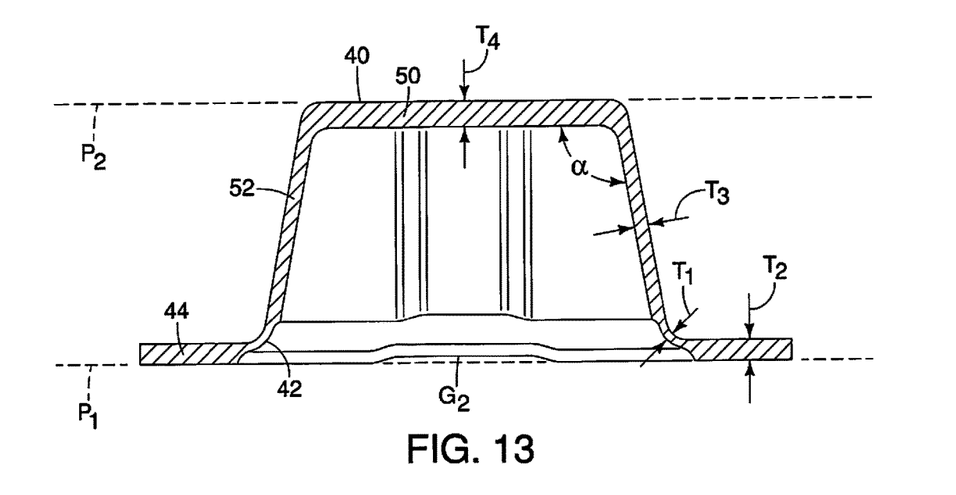
FIG. 13 is a cross-sectional view of water shield member taken along the line 13-13 in FIG. 12, showing differing thicknesses of each of the flange portion, the hinge portion, the wall section of the concaved portion and the base section of the concaved portion in accordance with the embodiment.

The hinge portion 42 has a rounded or curved shape, as viewed in cross-section in FIGS. 13, 14 and 15, and extends from the concaved portion 40 to the flange portion 44. The hinge portion 42 extends around opening 46 of the concave portion 40. The hinge portion 42 has a first thickness $T_1$, as shown in FIG. 13.

The flange portion 44 extends around the hinge portion 42 and the concaved portion 40, but is spaced apart from the concaved portion 40. Specifically, the hinge portion 42 extends from the flange portion 44 to the concaved portion 40. The flange portion 44 defines an upper gap $G_1$ and a lower gap $G_2$. Recessed areas 44a are defined adjacent to the lower gap G2. With the exception of the recessed areas 44a, the remainder of the flange portion 44 defines and extends along a first plane $P_1$, as shown in FIG. 13. Portions of the recessed areas 44a are offset from the first plane $P_1$ and are parallel to the first plane $P_1$. The flange portion 44 has an overall second thickness $T_2$ greater than the first thickness $T_1$, as shown in FIG. 13.

As shown in FIGS. 14 and 15, with the water shield member 12 installed to the inner door panel 26, the flange portion 44 is attached to the first surface 26a of the door panel 26, and the concaved portion 40 extends through the accessory opening 28, such that most, if not all, of the concaved portion 40 is located to the right side of the inner door panel 26, as depicted in FIGS. 14 and 15.

Figure 12:
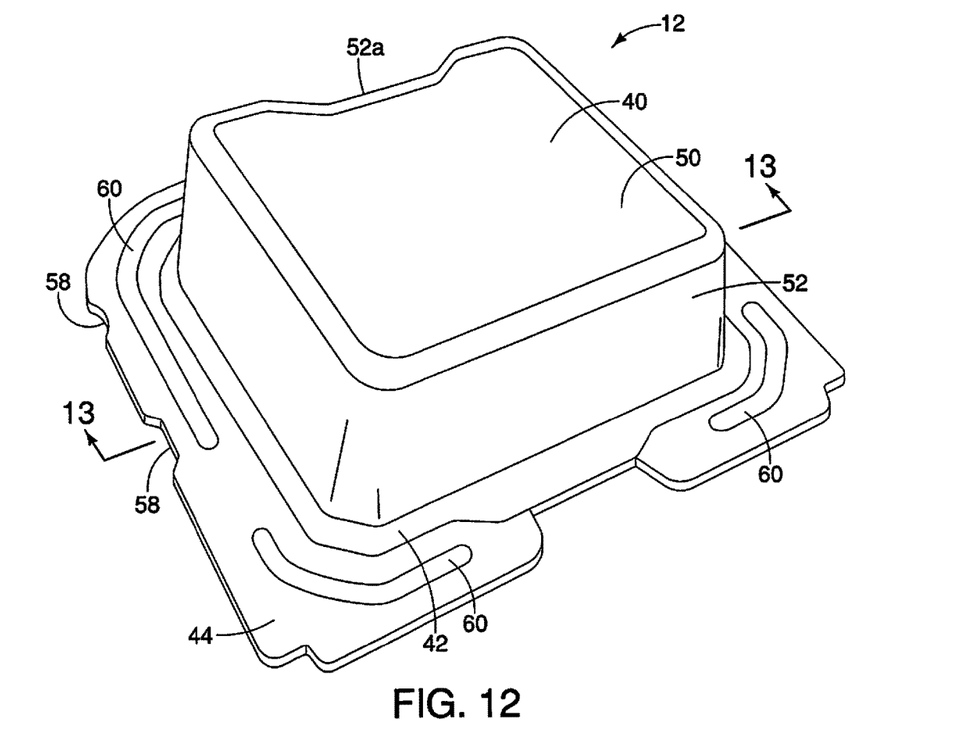
FIG. 12 is a perspective view of the water shield member removed from the door, showing the flange portion, the hinge portion and the concaved portion, the concaved portion having a base portion and a wall section that defines the concaved portion in accordance with the embodiment.

The concaved portion 40 includes a base section 50 and a wall section 52. The base section 50 is a generally flat or planar area to the right side of the water shield member 12, as viewed in FIGS. 7, 14 and 15. In the depicted embodiment in an uninstalled state, the base section 50 defines a second plane $P_2$ (FIG. 13) that is spaced apart from and parallel to the first plane $P_1$. The wall section 52 includes four planar (or approximately planar) segments that extend completely around the base section 50 defining the cup-like shape thereof. The segment of the wall section 52 adjacent to the gap $G_2$ includes a recessed or offset portion 52a, as shown in FIGS. 9, 12 and 13. Further the four segments of the wall section 52 extend from the base section 50 to the hinge portion 42. The four segments of the wall section 52 are not necessarily perpendicular to the second plane $P_2$. Rather, in the depicted embodiment, the four segments that define the wall section 52 can are angularly offset from the second plane $P_2$ by an angle a that is between 95 and 110 degrees. In an alternative embodiment, the fore segments of the wall section 52 can be perpendicular to the base section 50 and the second plane P2.

As shown in FIG. 13, the wall section 52 is formed with a third thickness $T_3$ that is greater than the first thickness $T_1$ and less than the second thickness $T_2$. The base section 50 has a fourth thickness $T_4$ that is greater than the first thickness $T_1$, the second thickness $T_2$ and the third thickness $T_3$.

In FIG. 13, the relative thicknesses have been exaggerated in order to make the differing thickness more apparent. In the depicted embodiment, the first thickness $T_1$ is 0.15 mm, the second thickness $T_2$ is 0.40 mm, the third thickness $T_3$ is 0.25 mm and the fourth thickness $T_4$ is 0.45 mm. However, it should be understood that these thickness values can vary depending upon the material used to form the water shield member 12, and the desired level of flexibility and elasticity desired. For example, the thicknesses $T_1$, $T_2$, $T_3$ and $T_4$ can vary such that one or more thicknesses are greater, or less than the example values given above. However, in the preferred embodiment, the following thickness relationships are maintained:

$$T4 > T2 > T3 > T1.$$

The base section 50 is relatively thick because it is designed to contact and engage the seatbelt retraction device 30. Contact between the seatbelt retraction device 30 and the base section 50 limits or prevents rattling of the seatbelt retraction device 30, as well as protect the seatbelt retraction device 30 against water. The hinge portion 42 is designed with a thin profile (compared to the remainder of the water shield member 12) such that the hinge portion 42 can exhibit more elastic properties than the remainder of the water shield member 12. Specifically, since the seatbelt retraction device 30 contacts the base section 50 when installed to the rear door 20, the hinge portion 42 allows the concaved portion 40 to move relative the flange portion 44.

As shown in FIGS. 6, 14 and 15, the flange portion 44 of the water shield member 12 attaches to the first surface 26a of the door panel 26 with the concaved portion 40 of the water shield member 12 extending through the accessory opening 28. The flange portion 44 includes a plurality recesses 58 that dimensioned and positioned to correspond to the plurality of alignment protrusions 36. When the water shield member 12 is installed to the rear door 30, the protrusions 36 fit into the recesses 58 aiding in positioning of the water shield member 12 relative to the door panel 26.

An adhesive material 60 (FIGS. 10 and 12) is applied to the flange portion 44 and is pressed against the first surface 26a to retain the water shield member 12 in position. Further, the seatbelt retraction device 30 attaches to the first surface 26a of the door panel 26 with portions of the seatbelt retraction device 30 extending into the opening 46 of the concaved portion 40. As shown in FIGS. 14 and 15, when fully installed, a section 30b of the seatbelt retraction device 30 presses against the concaved portion 40. Since the water shield member 12 is made from a flexible, elastic and resilient material, the base section 50 of the concaved portion 40 slightly deforms, conforming to the shape of the section 30b of the seatbelt retraction device 30, in addition to the elastic movement of the hinge portion 42. Hence, the base section 50, the wall section 52 of the concaved portion 40 and the hinge portion 42 are all under tension with the seatbelt retraction device 30 installed. The concaved portions 28b of the inner door panel 26 being offset from the first surface 26a of the door panel 26 allow some deflecting movement of the hinge portion 42, but are dimensioned to maintain the tension on the base section 50, the wall section 52 of the concaved portion 40 and the hinge portion 42. Further, the offset portion 52a contacts and can bottom out on the upwardly extending projection 28a (FIG. 7) acting as a stop the water shield member 12 is installed to the rear door 26.

In the depicted embodiment, the concaved portion 40, the hinge portion 42 and the flange portion 44 are all formed as a unitary, monolithic, uninterrupted sealing element. Further, the concaved portion 40, the hinge portion 42 and the flange portion 44 are formed together in a molding process.

The various vehicle structures and elements (other than the water shield member 12) are conventional components that are well known in the art. Since vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the water shield member. Accordingly, these terms, as utilized to describe the present invention should be interpreted relative to a vehicle equipped with the water shield member.

The term "configured" as used herein to describe a component, section or part of a device includes mechanical elements constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A water shield member comprising:
    a cup-shaped concaved portion having an opening;
    a hinge portion extending from the concaved portion and extending around opening of the concave portion, the hinge portion having a first thickness; and
    a flange portion that extends around the hinge portion and the concaved portion, the flange portion being spaced apart from the concaved portion and defining a first plane, the flange portion having a second thickness greater than the first thickness, the concaved portion, the hinge portion and the flange portion are all made of a common material.

2. The water shield member according to claim 1, wherein the concaved portion includes a base section and a wall section, the base section defining a second plane spaced apart from the first plane, the wall section extending completely around the base section, extending from the base section to the hinge portion.

3. The water shield member according to claim 2, wherein the wall section is formed with a third thickness that is greater than the first thickness and less than the second thickness.

4. The water shield member according to claim 3, wherein the base section has a fourth thickness that is greater than the first thickness, the second thickness and the third thickness.

5. The water shield member according to claim 1, wherein the flange portion having a first section and a second section, the first section at least partially surrounding the hinge portion and defining the first plane, with the second portion being offset from the first plane.

6. The water shield member according to claim 1, wherein the concaved portion, the hinge portion and the flange portion are all formed as a unitary, monolithic, uninterrupted sealing element.

7. The water shield member according to claim 6, wherein the concaved portion, the hinge portion and the flange portion are formed together in a molding process.

8. The water shield member according to claim 7, wherein the common material of the concaved portion, the hinge portion and the flange portion is flexible and elastic.

9. A door assembly, comprising:
    a door panel having a first surface and a second surface with an accessory opening defined in the door panel extending from the first surface to the second surface;
    a seatbelt retraction device fixedly attached to the first surface with a portion of the seatbelt retraction device extending into the accessory opening; and
    the water shield member according to claim 1, where the flange portion of the water shield member is attached to the first surface of the door panel with the concaved portion of the water shield member extending through the accessory opening such that portions of the seatbelt retraction device extend into the opening of the concaved portion and press against the concaved portion.

10. The door assembly according to claim 9, wherein the concaved portion of the water shield member includes a base section and a wall section, the base section defining a second plane spaced apart from the first plane, the wall section extending completely around the base section, extending from the base section to the hinge portion.

11. The door assembly according to claim 9, wherein the portions of the seatbelt retraction device press against the base section of the concaved portion causing the wall section to be under tension.

12. The door assembly according to claim 10, wherein the wall section is formed with a third thickness that is greater than the first thickness and less than the second thickness.

13. The water shield member according to claim 12, wherein the base section has a fourth thickness that is greater than the first thickness, the second thickness and the third thickness.

14. A door assembly, comprising:
    a door panel having a first surface and a second surface with an accessory opening defined in the door panel extending from the first surface to the second surface;
    a water shield member having:
        a cup-shaped concaved portion having an opening;
        a hinge portion extending from the concaved portion and extending around opening of the concave portion, the hinge portion having a first thickness; and
        a flange portion that extends around the hinge portion and the concaved portion, the flange portion being spaced apart from the concaved portion and defining a first plane, the flange portion having a second thickness greater than the first thickness, with the flange portion being attached to the first surface of the door panel and the concaved portion extending into the accessory opening; and
    a seatbelt retraction device fixedly attached to the first surface with a portion of the seatbelt retraction device extending into the opening of the concaved portion pressing against the concaved portion.

15. The door assembly according to claim 14, wherein the concaved portion, the hinge portion and the flange portion are all formed as a unitary, monolithic, uninterrupted sealing element.

16. The door assembly according to claim 15, wherein the concaved portion, the hinge portion and the flange portion are formed together in a molding process.

17. The door assembly according to claim 15, wherein the water shield member is made of a material that is flexible and elastic.

18. The door assembly according to claim 14, wherein the concaved portion includes a base section and a wall section, the base section defining a second plane spaced apart from the first plane, the wall section extending completely around the base section, extending from the base section to the hinge portion.

19. The door assembly according to claim 18, wherein the wall section is formed with a third thickness that is greater than the first thickness and less than the second thickness, and the base section has a fourth thickness that is greater than the first thickness, the second thickness and the third thickness.

20. The door assembly according to claim 14, wherein the first surface of the door panel includes a plurality of alignment protrusions, and the flange portion includes a plurality recesses dimensioned and positioned to correspond to the plurality of alignment protrusions aiding in positioning of the water shield member relative to the door panel.

* * * * *